United States Patent [19]

Marshall

[11] Patent Number: 4,634,757

[45] Date of Patent: Jan. 6, 1987

[54] FUSION PRODUCT

[75] Inventor: Clifford D. Marshall, Spring, Tex.

[73] Assignee: Shell Oil Company, Houston, Tex.

[21] Appl. No.: 755,025

[22] Filed: Jul. 15, 1985

[51] Int. Cl.$^4$ .................. C08G 59/02; C08G 59/68
[52] U.S. Cl. ........................................ 528/89; 528/104
[58] Field of Search .............. 528/89, 104, 365; 252/182

[56] References Cited

U.S. PATENT DOCUMENTS

| | | | |
|---|---|---|---|
| 3,477,990 | 11/1969 | Dante et al. | 260/47 |
| 3,547,881 | 12/1970 | Mueller et al. | 260/47 |
| 3,547,885 | 12/1970 | Dante et al. | 260/47 |
| 3,824,212 | 7/1974 | Sinnema et al. | 260/47 EP |
| 3,843,605 | 10/1974 | Schmidt et al. | 260/47 EP |
| 3,948,855 | 4/1976 | Perry | 528/89 |
| 3,978,027 | 8/1976 | Marshall | 260/47 EP |
| 4,048,141 | 9/1977 | Doorakian et al. | 528/89 |
| 4,132,706 | 1/1979 | Doorakian et al. | 528/89 |
| 4,320,222 | 3/1982 | Lopez | 528/89 |
| 4,352,918 | 10/1982 | Whiteside et al. | 528/89 |
| 4,438,254 | 3/1984 | Doorakian | 528/89 |

*Primary Examiner*—Earl Nielsen

[57] ABSTRACT

A process for reacting an acidic compound or anhydride with an epoxy-containing compound is disclosed. In a preferred embodiment this process comprises reacting a polyepoxide having more than one vic-epoxy group with a phenol in the presence of a methylene bis(triphenylphosphonium)halide catalyst.

15 Claims, No Drawings

FUSION PRODUCT

FIELD OF THE INVENTION

This invention relates to a process for reacting a phenol, carboxylic acid or acid anhydride with an epoxy-containing compound and to the resulting products. More particularly, the invention relates to a process for effecting a specific reaction between compounds possessing a vic-epoxy group and a phenolic hydroxyl group, carboxylic group or anhydride group, and to the products obtained thereby.

BACKGROUND OF THE INVENTION

Epoxy compounds are well known and include many compounds of varying molecular weight and epoxy equivalent weight. To simplify the production of a large number of epoxy compounds that vary mainly in molecular weight, it is common practice to manufacture a single epoxy compound of relatively low molecular weight and react the epoxy compound with a compound containing phenolic hydroxyl groups in the presence of catalyst so as to obtain epoxy of phenolic hydroxy ether compounds of desired higher molecular weight. The conventional catalysts employed are inorganic bases or tertiary amines which are also effective catalysts for competing reactions of epoxides with alcoholic hydroxyl groups, homopolymerization of epoxy groups and the like. As a result, the product obtained is a mixture of polymers and resins with varying degrees of molecular weight, chain branching and end group functionality. Such a composition detracts from the performance and utility of the product. More recent catalysts with improved selectivity include phosphonium halides as disclosed in U.S. Pat. No. 3,477,990, phosphines as disclosed in U.S. Pat. No. 3,547,881, 3-(trihydrocarbylphosphoranylidene)-2,5-pyrrolidinediones as disclosed in U.S. Pat. No. 3,843,605, alkylammonium halides as disclosed in U.S. Pat. No. 3,824,212, and tetrahydrocarbyl phosphonium salts as disclosed in U.S. Pat. No. 4,438,254.

Many of the above catalysts have found commercial utility. However, there is a continuing need for process and product improvements. For example, when many of these catalysts are admixed with the epoxy resins to produce a "pre-catalyzed" epoxy composition, the storage stability at elevated temperatures is not acceptable for many applications because of the reduced activity of the stored resin. U.S. Pat. No. 4,320,222 discloses an improved precatalyzed polyepoxide containing a synergistic catalyst composition comprising a phosphonium halide and an alkali metal halide or hydroxide.

In other cases the process steps must be controlled under strict conditions so as not to deactivate the catalyst. For example, U.S. Pat. No. 4,438,254 cited above requires that the fusion process be conducted at a temperature under 175° C. and under "essentially anhydrous conditions". Patentees define the term "essentially anhydrous" to mean that the reaction medium is absolutely free of water or contains a sufficiently "small quantity of water" not to deactivate the catalyst. The patentees found that deleterious reactions occurred with their catalyst with as little as 0.009 weight percent water present in the reaction medium (column 6, lines 53-58).

What is needed is a new catalyst that does not suffer from deleterious reactions with small quantities of water, thereby enabling much greater freedom of operation. Further, the precatalyzed epoxy resin must be stable at elevated temperature and active at the higher fusion temperatures.

SUMMARY OF THE INVENTION

The present invention, therefore, relates to the discovering of a specific catalyst for use in an epoxy fusion process (i.e., a conversion process employing acidic substances and/or anhydrides). In particular, the present invention is a process for preparing an advanced epoxy resin by reacting a compound containing at least one vic-epoxy group with a compound selected from the group consisting of phenols, carboxylic acids and carboxylic acid anhydrides in the presence of a catalyst selected from the group consisting of salts of the formula

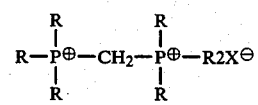

and

where R is hydrocarbyl or inertly substituted hydrocarbyl group and X is a compatible anion.

In a preferred embodiment the catalyst is methylene bis(triphenylphosphonium)dibromide (or "MBTPPB") or the structure of Formula I. Use of this MBTPPB catalyst in the fusion process has produced extraordinary results, as shown in the examples which follow. In particular, the above catalyst has markedly superior thermal stability and resistance to deactivation by water compared to the catalysts employed in the prior art, e.g., the examples used in the '254 patent described above. The catalyst of Formula II-e.g., triphenylphosphoranemethylenetriphenylphosphonium bromide ("TPPMTPPB") is also a very stable and active catalyst.

As shown in the Examples which follow, the percent conversion to higher molecular weight compounds with the catalyst of the present invention is not affected by the presence of water. As shown in Example 2, the addition of 0.48 percent weight water did not reduce the conversion, contrary to the prior art catalysts. Such performance is particularly surprising in view of the disclosures in U.S. Pat. No. 4,438,254 where much lower amounts of water resulted in dramatic reductions in conversion.

In a further embodiment the present invention relates to a pre-catalyzed epoxy resin composition comprising:
(a) a polyepoxide; and
(b) a catalytic amount of a catalyst of the formula I or II above.

In still further embodiments the catalyst of formula I or II is reacted with a polyepoxide and a compound selected from the group consisting of phenols, carboxylic acids and carboxylic acid anhydrides. Preferably the phenol possesses at least one and more preferably two or more phenolic hydroxyl groups. Preferably the carboxylic acid is a polycarboxylic acid and the carboxylic acid anhydride is a polycarboxylic acid anhydride.

DETAILED DESCRIPTION OF THE INVENTION

In a preferred, specific application the process of the invention involves the reaction of an epoxy compound and a phenol in the presence of a particular catalyst to form the desired phenolic hydroxy ether of the partial formula

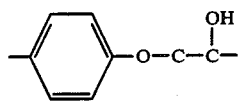

THE POLYEPOXIDES

The liquid polyepoxides employed in the present invention include those compounds possessing more than one vic-epoxy group per molecule, i.e. more than one

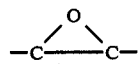

group per molecule. These polyepoxides are saturated or unsaturated, aliphatic, cycloaliphatic, aromatic or heterocyclic, and are substituted, if desired, with non-interfering substituents, such as halogen atoms, hydroxy groups, ether radicals, and the like. Preferred liquid polyepoxides include the so-called liquid glycidyl polyethers of polyhydric phenols and polyhydric alcohols. More preferred are the glycidyl polyethers of 2,2-bis(4-hydroxyphenyl)propane having an average molecular weight between about 340 and about 900 and a epoxide equivalent weight of between about 170 and about 500. Especially preferred are the glycidyl polyethers of 2,2-bis(4-hydroxyphenyl)propane having an average molecular weight of between about 340 and about 900, an epoxide equivalent weight of between about 170 and about 500, and containing from about 0.01% to about 1.0% weight or higher of saponifiable chlorine. As used herein the terms "epoxide equivalent weight" and "weight per epoxide" refer to the average molecular weight of the polyepoxide molecule divided by the average number of oxirane groups present in the molecule.

Various examples of polyepoxides that may be used in this invention are given in U.S. Pat. No. 3,477,990 (e.g., column 2, line 30 to column 4, line 75) and it is to be understood that so much of the disclosure of that patent relative to examples of polyepoxides is incorporated by reference into this specification.

THE PHENOLS

The phenols used in the process of the invention are those compounds possessing at least one hydroxyl group attached to an aromatic nucleus. The phenols are monohydric or polyhydric and are substituted, if desired, with a great variety of different types of substituents. Examples of the phenols include among others, phenol, resorcinol, o-cresol, m-cresol, p-cresol, chlorophenol, nitrophenol, hydroquinone, 2,2-bis(4-hydroxyphenyl)propane, 2,2-bis(4-hydroxyphenyl)pentane, and the like, and polymeric type polyhydric phenols obtained by condensing monohydric or polyhydric phenols with formaldehyde.

Preferred phenols to be used are the polyhydric phenols containing from 2 to 6 OH groups and up to 30 carbon atoms. Coming under special consideration are the phenols of the formula

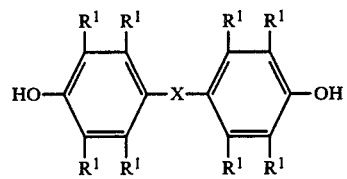

wherein X is a polyvalent element or radical and $R^1$ independently is a member of the group consisting of hydrogen, halogen and hydrocarbon radicals. The preferred elements or radicals represented by X are oxygen, sulfur, —SO—, —SO$_2$—, divalent hydrocarbon radicals containing up to 10 carbon atoms and oxygen, silicon, sulfur or nitrogen containing hydrocarbon radicals, such as —OR"O—, —OR"OR"O—, —S—R'—S—, —S—R"—S—R"—S, —OSiO—, —OSiOSiO—,

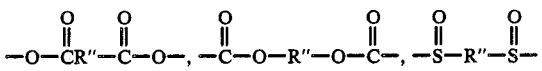

—SO$_2$—R"—SO$_2$— radicals wherein R" is a divalent hydrocarbon radical.

Various examples of phenols that may be used in this invention are also given in U.S. Pat. No. 3,477,990 (e.g., column 5, line 1 to column 6, line 10) and it is to be understood that so much of the disclosure of that patent relative to examples of phenols is incorporated by reference into this specification.

CARBOXYLIC ACIDS AND ANHYDRIDES

In a further embodiment of the invention the catalyst and polyepoxide may be reacted with a carboxylic acid and/or carboxylic acid anhydride in place of or in addition to the phenol.

The carboxylic acids used may be saturated, unsaturated, aliphatic, cycloaliphatic, aromatic or heterocyclic. Examples of these acids include, among others, succinic acid, glutaric acid, adipic acid, pimelic acid, suberic acid, azelaic acid, sebacic acid, oxalic acid, abietic acid, maleic acid, aconitic acid, chlorendic acid and phthalic acid.

The acid anhydrides used may be any anhydride which is derived from a carboxylic acid and possesses at least one anhydride group, i.e., a

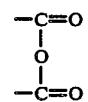

group. The carboxylic acids used in the formation of the anhydrides may be saturated, unsaturated, aliphatic, cycloaliphatic, aromatic or hetrocyclic. Examples of these anhydrides include, among others, phthalic anhydride, isophthalic anhydride, di-, tetra- and hexahydrophthalic anhydride. 3,4,5,6,7,7-Hexachloro-3,6-endomethylene 1,2-tetrahydrophthalic anhydride (chlorendic anhydide), succinic anhydride, maleic anhydride, chlorosuccinic anhydride, monochloromaleic anhydride, 6-ethyl-4-cyclohexene-1,2-dicarboxylic acid anhydride, 3,6-dimethyl-4-cyclohexene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhydride, adducts of maleic anhydride with polyunsaturates, such as methylcyclopentadiene. (Nadic methyl anhydride), 3-methoxy-1,2,3,6-tetrahydrophthalic acid anhydride, 3-butoxy-1,2,3,6-tetrahydrophthalic anhydride, trimellitic anhydride, pyromellitic anhydride, di-, tetra- and hexahydropyromellitic anhydride, polyadipic acid anhydride, polysebacic acid anhydride, and the like and mixtures thereof. Derivatives of the anhydrides, such as their partial esters, amides, etc., may also be employed. Examples of these include, for example, esters of glycols and pyromellitic anhydride and partial esters of trimellitic anhydride.

CATALYST

The catalysts used in the present invention are selected from the group consisting of salts of the formulas

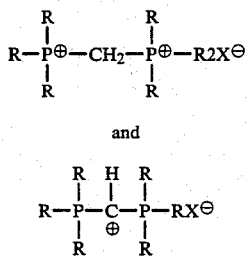

where R is a hydrocarbyl or inertly substituted hydrocarbyl group and X is a compatible anion.

The compatible anion, $X^\ominus$, can be any anion used in the prior art for such catalyts. Preferred as anions are halides, i.e. $Br^\ominus$, $Cl^\ominus$ or $I^\ominus$; carboxylates, such as formate, acetate, oxalate or trifluoroacetate; conjugate bases of weak inorganic acids, such as bicarbonate, tetrafluoroborate or biphosphate and conjugate bases of a phenol, such as phenate or an anion derived from bisphenol A. The most preferred anions are halides, with bromide being the most preferred halide.

The R groups borne by the phosphonium cations can be aliphatic or aromatic in character. Preferably each phosphonium cation bears at least one R group which is aromatic in character, more preferably at least two such aromatic groups. These aromatic groups preferably are phenyl or inertly substituted phenyl.

Those R groups which are not aromatic are preferably $C_1$-$C_{20}$ alkyl.

Most preferably, all the R groups are phenyl, and the catalyst of formula I is used. Accordingly, the much preferred catalyst is methylene bis(triphenylphosphonium)dibromide.

The methylene bis(triphenylphosphonium)dibromide can be conveniently prepared by refluxing under nitrogen for about 2 hours a mixture having a mole ratio of methylene bromide to triphenylphosphine of 2. The excess methylene bromide is removed by distillation and the crude product dissolved in methanol and precipitated by the addition of ethyl actetate. In one sample the purified salt had a bromine content ($AgNO_3$ titration) of 22.1 %w (theory 22.9 %w).

Triphenylphosphoranemethylenetriphenylphosphonium bromide can be prepared by treating methylene bis(triphenylphosphonium)dibromide (2.5 millimols) with $Na_2CO_3$ (about 6 millimols) at about 5 %w in water/methanol (3/1 by weight) at reflux for about 3 to 4 hours and then removing the methanol by distillation. The solids separating from the cooled reaction mixture are collected by filtration and recrystallized from methylene chloride/ethyl acetate. In one example, the purified salt had 12.95 %w bromine (theory 13.0 %w).

PREPARATION OF THE PHENOLIC HYDROXY ETHER COMPOUNDS

The amount of the epoxide and the phenol to be employed in the process varies over a wide range depending upon the type of reactants and the type of product to be produced. In general, these reactants are used in approximately chemical equivalent amounts, i.e., a chemical equivalent amount of the phenol will be that sufficient to furnish one phenolic hydroxyl for every epoxy group to be reacted. For example, if one is reacting a diepoxide with a monohydric phenol and both epoxy groups are to be reacted, one mole of diepoxide should be reacted with about two moles of the monohydric phenol. On the other hand, if one is reacting a diepoxide with a dihydric phenol and a monomer product is desired by reacting both phenolic groups, one should react about two moles of the diepoxide with one mole of the dihydric phenol. If a polymeric product is desired smaller ratios should be utilized as desired, such as, for example, 5 moles of the diepoxide and 4 moles of the dihydric phenol.

Superior results are obtained when the higher molecular weight resins are produced and in this case the ratios of reactants are varied depending upon the molecular weight desired and upon the type of end groups, i.e., whether the product is to be terminated with an epoxide or with a phenol.

An especially preferred use of the present invention is in the preparation of a phenolic hydroxy ether resin having a epoxide equivalent weight of between about 400 and about 4000 wherein the resin is prepared by reacting 2,2-bis(4-hydroxyphenyl)propane with the diglycidyl ether of 2,2-bis(4-hydroxyphenyl)propane having a saponfiable chlorine content of between about 0.01% and about 1.0% weight and an epoxide equivalent weight of between about 170 and about 500.

The amount of the catalyst employed varies widely. In general, the amount of catalyst varies from about 0.001% to about 1% by weight, of the total reactants, more preferably from about 0.002% to about 0.2% and most preferably from about 0.3% to about 0.1% by weight of the reactants.

The reaction is conducted in the presence or absence of solvents or diluents. In most cases, the reactants are liquid and the reaction is easily effected without the addition of solvents or diluents. However, in some cases, where either or both reactants are solids or viscous liquids it is desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent is typically retained in the reaction mixture. Otherwise, the solvent is removed by any suitable method such as by distillation or the like.

Phosphonium salts have been used as catalysts for promoting the reaction between epoxides and acidic materials for quite some time. Up to now the salts employed have been ones that even at fairly low concentrations of water are in the course of the reaction converted into inactive phosphine oxides; temperatures higher than about 175° C. are also reported to contribute to the loss of catalytic activity (U.S. Pat. No. 4,438,254). In contrast the subject salts of this invention are quite tolerant of water contents of up to about 0.5 %w and reaction temperature of up to 195°-200° C. This tolerance for water provides an economic advantage since the cost entailed in achieving very low water contents is avoided; the tolerance for higher temperature also provides an economic advantage since reaction cycle times can be reduced by reacting at higher temperatures.

The products obtained by the above process are the desired phenolic hydroxy ether compounds. Their physical characteristics depend upon the desired reactants and proportions. In general, the products vary from liquids to solids. The polyfunctional reactants also give products terminated in phenolic hydroxyl groups and/or epoxy groups, and these are available for further reaction.

A group of products which are particularly outstanding are those resins and polymers obtained by the reaction of the polyepoxides and polyhydric phenols in controlled proportions. Those which use an excess of the polyepoxide are terminated in epoxy groups and can be used as polyepoxides in known reactions of polyepoxides and curing agents and the like. These high molecular weight polyepoxides are particularly useful in preparing surface coatings, adhesives, laminates, filament windings, coatings for highways and airfields, structural applications, formation of foams and the like. Those prepared from the halogenated polyhydric phenols are particularly useful as flame proofing resins for forming laminates, coatings and the like. As stated earlier, the present invention is particularly useful for preparing epoxy resins to be used as coatings.

CURING OF THE EPOXY CONTAINING, PHENOLIC HYDROXY ETHER COMPOUNDS

The epoxy-containing, phenolic hydroxy ether compounds obtained by use of the present invention are reacted with various conventional curing agents to form hard insoluble, infusible products. Examples of suitable curing agents include, among others, the polybasic acids and their anhydrides such as the di, tri- and higher carboxylic acids; those acids containing sulfur, nitrogen, phosphorus or halogens; amino-containing compounds such as, for example, diethylene triamine, aminoethylpiperazine, dicyandiamide and triethylenetriamine and pyridine; polyamides containing active amino and/or carboxyl groups; and others.

The amount of curing agent varies considerably depending upon the particular agent employed. For the alkalies or phenoxides, 1% to 4% by weight is generally suitable. With phosphoric acid and esters thereof with appropriate crosslinking resin, good results are obtained with 1 to 10% by weight added. The tertiary amine compounds are preferably used in amounts of about 1% to 15% by weight. The acids, anhydrides, polyamides, polyamines, polymercaptans, anhydrides, etc. are preferably used in at least 0.8 equivalent amounts, and preferably 0.8 to 1.5 equivalent amounts. An equivalent amount refers to that amount needed to give one active hydrogen (or anhydride group) per epoxy group.

Solvents or diluents are sometimes added to make the composition more fluid or sprayable. Preferred solvents or diluents include those which are volatile and escape from the polyepoxide composition before or during cure such as ketones, ethers, chlorinated hydrocarbons and the like. To minimize expense, these active solvents are often used in admixture with aromatic hydrocarbons such as benzene, toluene, xylene, etc. and/or alcohols such as ethyl, isopropyl or n-butyl alcohol. Solvents which remain in the cured compositions are used, such as diethyl phthalate, dibutyl phthalate and the like. It is also convenient to employ normally liquid glycidyl compounds, glycidyl cyclopentyl ether, diglycidyl ether, glycidyl ether of glycerol and the like, and mixtures thereof.

Other materials are also added to the composition as desired. This includes other types of polyepoxides such as described in U.S. Pat. No. 3,477,990. This also includes fillers, such as sand, rock, resin particles, graphite, asbestos, glass or metal oxide fibers, and the like, plasticizers, stabilizers, asphalts, tars, resins, insecticides, fungicides, anti-oxidants, pigments, stains and the like.

The temperature employed in the cure varies depending chiefly on the type of curing agent. The amino-containing curing agents generally cure at or near temperature and no heat need be applied. The acids, anhydrides, and melamine derivatives, on the other hand, generally require heat, such as temperatures ranging from about 150° F. to about 400° F. Preferred temperatures range from about 200° F. to about 400° F., and more preferably from about 250° F. to 380° F.

The compositions containing the polyepoxides and curing agents are used for a variety of important applications. They are used, for example, as adhesives for metal, wood, concrete, plaster and the like, and as surface coatings for various types of surfaces. The new compositions are also used in the preparation of laminates or resinous particles reinforced with fibrous textiles. They are also used in the formation of castings and molding and for the encapsulation of electrical equipment.

The invention is further illustrated by means of the following examples. Note that the examples are given for the purpose of illustration only and that the invention is not to be regarded as limited to any of the specific conditions or reactants noted therein.

As used in the examples which follow, "WPE" refers to weight per epoxide. Gardner-Holdt viscosity is measured according to ASTM Method D-1545, and the significance of the measurement is discussed in J. J. Mattiello, Protective and Decorative Coatings, Volume V, p. 186 (1946).

ILLUSTRATIVE EXAMPLE 1

In Illustrative Example 1 the storage stability of various diphosphonium salts were examined. In all examples, the catalyst concentration was 0.25 meq/100 g of resin (or 0.125 millimoles/100 g of resin). The starting epoxy compound containing the catalyst was a liquid polyepoxide having a WPE of about 185. The starting phenolic compound used in the fusion reaction was 2,2-bis(4-hydroxyphenyl)propane (BPA). The storage times for the precatalyzed resins were as shown in Table 1.

A small scale reaction was made to assess the retention of activity of the stored resin. Thus, about 10 grams of resin was admixed near 150°–160° C. with sufficient bisphenol-A to give a product with a WPE of about 500 at 100% bisphenol-A conversion, the mixture being held at 160° C. for about 45 minutes.

The catalyst employed had the formula $$R-\overset{\overset{R}{|}}{\underset{\underset{R}{|}}{P^{\oplus}}}-Y-\overset{\overset{R}{|}}{\underset{\underset{R}{|}}{P^{\oplus}}}-R_2X^{\ominus} \quad I$$

or $$R-\overset{\overset{R}{|}}{\underset{\underset{R}{|}}{P}}-Z-\overset{\overset{R}{|}}{\underset{\underset{R}{|}}{P}}-RX^{\ominus} \quad II$$

where all R are phenyl groups, X is bromide and the Y or Z radical moiety is as shown in Table 1.

As shown in Table 1, the best candidates were MBTPPB and TPPMTPPB.

TABLE 1
STORAGE STABILITY OF PRECATALYZED RESINS BASED ON BIS-TRIPHENYLPHOSPHONIUM BROMIDES AT 200° F. (CATALYST CONCENTRATION ~0.25 MEQ/100 G

| Radical Moiety | Formula | WPE of Fusion Resin[1] After X Days Storage | | | | |
|---|---|---|---|---|---|---|
| | | 0 Day | 1 Day | 3 Days | 6 Days | 7 Days |
| —(CH$_2$)$_1$— | I | 493 | 487 | 487 | — | 502 |
| —(CH$_2$)$_2$— | I | 422 | 307 | — | — | — |
| —(CH$_2$)$_3$— | I | 471 | 436 | 322 | — | — |
| 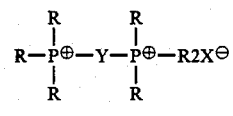 | I | 399 | 259 | — | — | — |
| 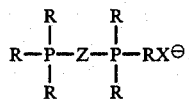 | I | 333 | 257 | — | — | — |
| —(CH)— $\oplus$ | II | 495 | — | — | 520 | — |
| No Catalyst | | 256 | — | — | — | — |

[1]Target WPE = ~500.

ILLUSTRATIVE EXAMPLE 2

Illustrative Example 2 deals with additional storage tests using the following catalysts:
MBTPPB—methylene bis(triphenylphosphonium)bromide
TPPMTPPB—triphenylphosphoranemethylenetriphenylphosphonium bromide
ETPPP—ethyl triphenylphosphonium phosphate
ETPPI—ethyl triphenylphosphonium iodide The results are shown in Table 2. The rank order of these systems is clearly evident from the active life period, with MBTPPB and TPPMTPPB being clearly the best.

TABLE 2
STORAGE STABILITY OF PRECATALYZED RESINS AT 200° C. (CATALYST CONCENTRATION ~0.25 MEQ/100 G)

| Storage Time, Days | MBTPPB As Catalyst | TPPMTPPB As Catalyst | ETPPP As Catalyst[2] | ETPPI As Catalyst |
|---|---|---|---|---|
| A. WPE of Fusion Resin Based On | | | | |
| 0 | 493 | 495 | 484 | 486 |
| 1 | 487 | — | 489 | 479 |
| 3 | 487 | — | 483 | 477 |
| 6 | — | 520 | — | — |
| 7 | 502 | — | 503 | 298 |
| 14 | 538 | 555 | 454 | 267 |
| 21 | 556[1] | — | 292 | — |
| 29 | — | 617 | — | — |
| B. WPE of Precatalyzed Resin on Storage | | | | |
| 0 | 189 | 187 | 207 | 189 |
| 14 | 200 | 197[3] | 213 | 196 |
| 21 | 204 | 202[3] | 214 | — |
| 54 | — | 220 | — | — |

[1]Theory WPE = 559 using liquid resin WPE of 204.
[2]Based on commercial sample, the anion believed to be of the phosphate family.
[3]Estimated.

It was of great interest to learn how much active catalyst remained in these aged systems, so $^{31}$P NMR tests were run on them with the following results: the 21-day old ETPPP had no detectable amount of the ethyl triphenyl phosphonium cation left but showed the presence of ethyldiphenyl phosphine oxide and triphenylphosphine oxide in about a 2/1 ratio; the 21-day old MBTPPB still had about 90% of the active catalyst with about 10% present as probably triphenylphosphine oxide. This indicates that the MBTPPB catalyst to be an *extremely thermally stable* catalyst.

ILLUSTRATIVE EXAMPLE 3

In illustrative Example 3 the effect of water on catalyst deactivation is noted.

It is quite evident from the data on the percent conversion that water increases the rate of inactivation of the ETPP$^+$, 0.5%w added water lowering the percent conversion to the mid nineties for ETPPP and ETPPI. Note, however, that the same percent conversion was achieved with MBTPP$^{++}$ with or without added water. From the $^{31}$P NMR data, however, it is clear that for MBTPP$^{++}$ water does increase the rate of inactivation, there being about 80% active catalyst remaining without added water and 60% with added water. However, note below that essentially no active ETPP$^+$ remains in ETPPI even when no water is added. Thus, MBTPPB$^{++}$'s inactivation by water is very much slower than that for ETPP$^+$. The results are shown in Table 3.

TABLE 3
INFLUENCE OF WATER ON FUSION CATALYSTS
Reaction Conditions: Catalyst at 0.16 meq/100 g, steep temperature profile to 380° F., hold at 380° F. for 1 hour.

| | Cat. Used | | | | | |
|---|---|---|---|---|---|---|
| | MBTPPB | | ETPPP[1] | | ETPPI | |
| Added H$_2$O, % w | 0[2] | 0[2] | 0.48 | 0.49 | 0.49 | 0[2] |
| Theory WPE | 1773 | 1795 | 1767 | 2020 | 1779 | 1522 |
| Fd. WPE | 2002 | 2036 | 2057 | 1609 | 1544 | 1586 |
| Conversion of epoxide, % of Theory | 102.2 | 102.2 | 102.7 | 95.5 | 97.1 | 101 |
| Active Cat. | ~80 | — | ~60 | 0 | 0 | 0 |

TABLE 3-continued

INFLUENCE OF WATER ON FUSION CATALYSTS
Reaction Conditions: Catalyst at 0.16 meq/100 g, steep temperature profile to 380° F., hold at 380° F. for 1 hour.

| | Cat. Used | | |
|---|---|---|---|
| | MBTPPB | ETPPP[1] | ETPPI |
| Remaining, %[3] | | | |

[1]Based on commercial sample, the anion believed to be of the phosphate family.
[2]"As is" water content is between about 0.03% w and 0.07% w.
[3]Estimated from $^{31}$P NMR.

ILLUSTRATIVE EXAMPLE 4

Users of precatalyzed epoxy resins based on ETPPI, who make their own fusion resin and esterify the resin with acids to make surface coatings must add an esterification catalyst since the phosphonium catalyst is "dead" after the initial fusion reaction; with no added catalyst, the esterification cook reaches quite high viscosities or even gels before a satisfactorily low acid number is reached. Sodium carbonate can be used for this purpose at a level of about 0.6 meq of alkalinity/100 g of total charge. Since the catalyst of the present invention is not wholly inactivated, an ester cook (D-4) with a fusion resin catalyzed with MBTPPB was run following the recommendations for typical fusion products but omitting the added Na$_2$CO$_3$. As a control a fusion resin catalyzed with ETPPI but without carbonate addition was used. The results are presented in Table 4 along with typical results for ETPPI-catalyzed resins with addition of Na$_2$CO$_3$. Note that ETPPI-catalyzed resins without added carbonate ultimately gave a gel at a fairly high acid number.

It is of significant practical interest to note that for the above fusion resin made at 350° F. none of the MBTPP$^{++}$ was converted into a phosphine oxide; in contrast, at 380° F. it was found that about 20% converted into inactive oxide.

TABLE 4

RESIN ESTER D-4[1] COOKS WITH PRECATALYZED RESINS

| | Fusion Catalyst | | |
|---|---|---|---|
| | MBTPPB | ETPPI | ETPPI[2] |
| Conc., Meq/100 g | ~0.18[3] | 0.17 | 0.17 |
| Ester. Catalyst Added | None | None | Na$_2$CO$_3$ |
| Ester. Catalyst Conc., Meq/100 g | ~0.10[4] | 0.0 | ~0.6 |
| Fusion Conditions: | After exotherm cool to 350° F. and hold 1 hour. | | |
| Ester Conditions: | After adding acid, raise temperature quickly to 500° F. removing H$_2$O by azeotroping with xylene and hold at 500° F. for 4 hours after acid addition. | | |
| Theoretical WPE of Fusion Resin | 865 | 875 | ~850 |

| | Esterification Data[5] | | | | | |
|---|---|---|---|---|---|---|
| | Fusion Cat. | | | | | |
| | MBTPPB | | ETPPI | | ETPPI | |
| Hours After Acid Add'n. | Acid No. | η (G-H) | Acid No. | η (G-H) | Acid No. | η (G-H) |
| 1 | 18.9 | — | 30.7 | T+ | — | — |
| 2 | 9.2 | Q | 10.9 | U— | 4.8 | R— |
| 3 | 4.8 | T+ | 6.9 | Z-4 | 2.5 | T |
| 4 | 2.6 | U+ | Gel | | 1.3 | T-U |

[1]D-4 means that 40% of the total esterificable functionality of the resin has been converted by dehydrated castor fatty acid.
[2]Values in this column are for a typical cook with commercial products.
[3]$^{31}$P NMR showed presence only of MBTPP$^{++}$, no oxides for this 350° F. fusion reaction.
[4]This is the concentration of the leftover fusion catalyst after the fatty acid had been charged to the reaction.
[5]Acid number on 100% solids; Gardner-Holdt viscosity on 50% w solids in xylene, 25° C.

What is claimed is:

1. A process for preparing an advanced epoxy resin, the process comprising reacting a polyepoxide containing at least one vic-epoxy group with a compound selected from the group consisting of phenols, carboxylic acids and carboxylic acid anhydrides in the presence of a catalyst selected from the group consisting of

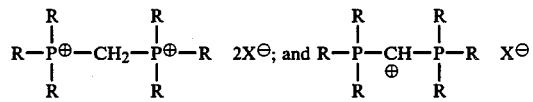

where R is a hydrocarbyl or inertly substituted hydrocarbyl group and X is a compatible anion, in a reaction mixture of polyepoxide, compound and catalyst having a water content greater than about 0.01 percent by weight of the weight of said reaction mixture.

2. The process of claim 1 wherein said compound is a phenol possessing at least one phenolic hydroxyl group.
3. The process of claim 1 wherein R is an aryl group.
4. The process of claim 3 wherein R is a phenyl group.
5. The process of claim 1 wherein X is a halide.
6. The process of claim 5 where the X is bromide.
7. The process of claim 1 wherein the catalyst is methylene bis(triphenylphosphonium)dibromide.
8. The process of claim 1 wherein the compound is selected from the group consisting of polycarboxylic acids and polycarboxylic acid anhydrides.
9. The process of claim 1 wherein the amount of catalyst employed is between about 0.001 and about 1.0 percent by weight based on the amount of polyepoxide.
10. The process of claim 2 wherein the polyepoxide, phenol and catalyst are reacted at a temperature between about 110° C. and about 200° C.
11. The process of claim 10 wherein the temperature is between about 180° C. and about 200° C.
12. The process of claim 10 wherein the phenol is 2,2-bis(4-hydroxyphenyl)propane and the catalyst is methylene bis(triphenylphosphonium)dibromide.
13. The process of claim 1 wherein the polyepoxide is a diglycidyl ether of 2,2-bis(4-hydroxyphenyl)propane.
14. The process of claim 13 wherein the diglycidyl ether of 2,2-bis(4-hydroxyphenyl)propane has an epoxide equivalent weight between about 170 and about 500.
15. The process of claim 13 wherein the compound employed is 2,2-bis(4-hydroxyphenyl)propane.

* * * * *